Patented June 2, 1953

2,640,800

UNITED STATES PATENT OFFICE 2,640,800

TETRAETHYL PYROPHOSPHATE INSECTICIDE

David L. Shatto, Riverside, Calif., assignor to California Spray-Chemical Corporation, Richmond, Calif., a corporation of Delaware No Drawing. Application September 6, 1949, Serial No. 114,273

4 Claims. (Cl. 167—22)

This invention relates to insecticidal dust compositions containing as the principal toxic ingredient the substance known to the trade as hexaethyl tetraphosphate, that is, the so-called hexaethyl ester of tetraphosphoric acid. The term "hexaethyl tetraphosphate" as used herein refers to the material so designated in the insecticidal industry and commonly, but not necessarily, made by the process described in U. S. Patent No. 2,336,302.

The insecticidal potency of hexaethyl tetraphosphate, especially its efficiency as an aphiscide, has been reported. The material is, however, very unstable when exposed to the atmosphere. It has been used as an insecticide when in the form of a solution or water emulsion applied as a spray or mist, but attempts to prepare a commercially satisfactory dust containing hexaethyl tetraphosphate have been unsuccessful. The reason for this failure lies in the fact that the incorporation of hexaethyl tetraphosphate with the commonly used powdered carriers or extenders such as kaolin, talc, soapstone, Vermiculite, redwood flour, etc., results in a product which loses its insecticidal power very rapidly—within a matter of hours, or at best within a day or two. The decline in insecticidal potency of such compositions is so rapid that their value for commercial usage is substantially nil.

As is well known, the cost of applying an insecticide in the form of a dust is but a fraction of the cost of spray application. It is, therefore, highly desirable that a way be found to prepare a satisfactory agricultural dust containing hexaethyl tetraphosphate and thereby greatly extend the field in which advantage may be taken of its outstanding insecticidal value.

I have discovered a composition which overcomes these difficulties and which provides a stable, economical and otherwise satisfactory hexaethyl tetraphosphate dust composition. In its simplest form of composition my invention comprises an incorporation of the desired amount of hexaethyl tetraphosphate with a carrier comprising sulfate of calcium, barium or strontium, in the form of a dry powder. The calcium sulfate suitable for use in my composition should contain not to exceed one-half mol of water of hydration per mol of sulfate, and preferably considerably less. In any case, whether the barium, strontium or calcium sulfate is used, it is important that it be substantially moisture-free. Dusts of this basic composition, together with modifications which give still more satisfactory results, are described and illustrated below.

A suitable concentration of hexaethyl tetraphosphate in dust for most field use is 3% by weight. A composition containing 3% by weight of hexaethyl tetraphosphate thoroughly mixed with powdered plaster of Paris ($2CaSO_4.H_2O$) is 100% aphiscidal if used within two or three days of compounding. In some circumstances such prompt application is practicable. The aphiscidal potency of this composition is found, however, after seven days to have declined to less than half of its original value. On the other hand, the usual dust carriers such as talc, organic flour, etc., lose substantially all of their potency in less than 24 hours after blending.

I have discovered that a much more stable dust composition is obtained by the use of an anhydrous sulfate carrier, that is, the naturally anhydrous barium or strontium sulfate or calcium sulfate which has previously been dehydrated by calcining. Calcination at a temperature of the order of 200° C. gives satisfactory results. The source of calcium sulfate for this purpose is not critical. I may use plaster of Paris or natural or artificial gypsum, for example.

Although the above-described compositions are sufficiently stable and dustable for commercial field use, I have found that superior compositions may be obtained if, instead of simply grinding the sulfate and hexaethyl tetraphosphate together, I first prepare a solution of hexaethyl tetraphosphate and impregnate the dry powdered sulfate with this solution. The amount of solution used may be varied, provided the quantity is not such as to impair the fluffiness or dustability of the powder. For example, a suitable composition may be made by applying 6% of a 50% solution of hexaethyl tetraphosphate to one of the sulfates described, or to a mixture of them. Impregnation of the powdered sulfate with hexaethyl tetraphosphate solution is conveniently done by spraying the solution over a quantity of the sulfate while the latter is being turned over or agitated, as in a grinding mill.

The solvents suitable for use in impregnating the sulfate comprise, in general, alcohols, ketones or aromatics, preferably those of comparatively high boiling point. Di-acetone alcohol and methyl isobutyl ketone are examples of solvents which I have found to be very satisfactory.

The use of a solvent-impregnated sulfate instead of a mechanical mixture is advantageous in terms of stability, as measured by rate of knockdown and kill, whether a small amount of water of hydration is present (e. g., uncalcined plaster of Paris) or not. In order to obtain optimum results, I use barium or strontium sulfate or calcined (that is, substantially water-free) calcium sulfate impregnated as described above. An example of such composition is one comprising anhydrous calcium sulfate which has been impregnated with 6% by weight of a 50% solution of hexaethyl tetraphosphate in di-acetone alcohol.

I have observed that dust compositions described above, although fully practicable and useful for agricultural use, nevertheless are not quite as light and fluffy as the insecticidal dusts to which the trade is accustomed and for which the usual dusting equipment is designed. I have discovered that the dust compositions of my invention may be improved in this respect without at the same time impairing their stability and insecticidal efficiency by incorporating therewith a minor amount, for example from 5 to 15% by weight, of powdered diatomite. For best results I first thoroughly dry such diatomite. A temperature of the order of 200° C. is satisfactory for this purpose.

An example of a composition of the type above referred to is one comprising 10% by weight of dry diatomite and the balance anhydrous $CaSO_4$ impregnated with 6% of a 50% solution of hexaethyl tetraphosphate in di-acetone alcohol.

The powdered diatomite may itself be impregnated with the hexaethyl tetraphosphate solution if desired in order to increase the content of toxic ingredient in the final composition.

Although the above examples contain hexaethyl tetraphosphate in the proportion of 3% by weight, this proportion may be varied according to the needs of the pest control usage. For most field uses I find that 3% is adequate to give satisfactory results, but concentrations as low as 1% or as high as 5% may be used in special cases.

It has been recognized that the hexaethyl tetraphosphate herein described is actually a mixture of phosphate esters in which the active toxic ingredient is the tetraethyl diphosphate component. The ultimate structure or composition of this tetraethyl diphosphate component has not been conclusively established although recognition has been given to the fact that tetraethyl pyrophosphate is at least the major toxic constituent of the active component.

This active component is present in the hexaethyl tetraphosphate composition in varying amounts of the order of 10–15% by weight when prepared by the reaction of 1 mol of triethyl phosphate with 3 mols of phosphorus oxychloride. By increasing the mol ratio of the reactants within the range of from 1:4 to 1:7, the proportion of active component in the composition may be increased to varying amounts greater than 30% by weight and generally in the order of 40–50%.

These insecticidal compositions of increased toxicity or increased tetraethyl diphosphate content may likewise be resolved into the stable dust formulations of the invention. Thus, increased stability in dusting formulations may be obtained through the use of an anhydrous alkaline earth sulfate as the primary carrier. Furthermore, these improvements in stability are not only applicable to insecticidal compositions containing greater than 30% by weight of tetraethyl diphosphate as prepared above but may be applied to the commercial tetraethyl diphosphates such as tetraethyl pyrophosphate prepared by any of the conventional methods.

In preparing the stabilized dust compositions, the amount of the insecticidal phosphate component may be either the same as previously indicated for hexaethyl tetraphosphate, namely about 1–5% by weight or proportionate to the amount of the actual toxic component in the phosphate mixture. Thus, based on 10% toxic component in hexaethyl tetraphosphate and 30% of the same toxic component in the tetraethyl diphosphate or tetraethyl pyrophosphate composition, the proportion of the latter in the dust formulations should be at least 0.3% by weight and preferably in the range of about 0.3 to 1.5% by weight.

This application is a continuation-in-part of our copending application, Serial No. 693,383, filed August 27, 1946.

Obviously, many modifications and variations of the invention as hereinbefore set forth may be made without departing from the spirit and scope thereof, and only such limitations should be imposed as are indicated in the appended claims.

I claim:

1. An insecticidal dust composition comprising tetraethyl pyrophosphate and anhydrous calcium sulfate as a stabilizer therefor.

2. An insecticidal dust composition comprising an anhydrous calcium sulfate carrier impregnated with a solution of an insecticidal agent containing tetraethyl pyrophosphate as an active toxic ingredient.

3. An insecticidal dust composition comprising an intimate mixture of a minor proportion of dry diatomaceous earth with an anhydrous calcium sulfate carrier impregnated with a solution of a mixture of phosphate esters containing tetraethyl pyrophosphate as an active toxic ingredient.

4. An insecticidal dust composition comprising an intimate admixture of a mixture of phosphate esters containing tetraethyl diphosphate as an active toxic ingredient, dry diatomaceous earth and anhydrous calcium sulfate, said dry diatomaceous earth being present in amounts ranging from 5 to 15% by weight based upon the aforesaid admixture.

DAVID L. SHATTO.

References Cited in the file of this patent

UNITED STATES PATENTS

| Number | Name | Date |
|---|---|---|
| 789,176 | Smith | May 9, 1905 |
| 1,631,903 | Van Der Lande | June 7, 1927 |
| 2,215,603 | Christensen et al. | Sept. 24, 1940 |

FOREIGN PATENTS

| Number | Country | Date |
|---|---|---|
| 401,452 | Germany | Sept. 3, 1924 |

OTHER REFERENCES

Chemical & Engineering News, April 1947, page 1070.

Kilgore—Soap and Sanitary Chemicals, December 1945, pages 138, 139, 169, 171.

Hall et al.—Ind. & Engr. Chem., April 1948, pages 694 to 698.

Ludvik et al.—Journal Economic Entomology, volume 40, Number 1, February 1947, pages 97 to 100.